United States Patent [19]
Mitsui et al.

[11] 3,905,704
[45] Sept. 16, 1975

[54] DEVICE FOR DETERMINING LIGHT DIRECTIVITY OF LUMINESCENT ELEMENT

[75] Inventors: Kotaro Mitsui; Akira Ishizu; Wataru Susaki, all of Itami, Japan

[73] Assignee: Mitsubishi Denki Kabushiki Kaisha, Japan

[22] Filed: Dec. 21, 1973

[21] Appl. No.: 427,332

[30] Foreign Application Priority Data
Dec. 27, 1972 Japan.............................. 47-2651[U]

[52] U.S. Cl. ................. 356/152; 356/121; 356/127
[51] Int. Cl. ......................... G01b 11/26; G01j 1/00
[58] Field of Search ........... 356/121, 122, 123, 124, 356/127, 152, 153, 154; 250/553, 211 J

[56] References Cited
UNITED STATES PATENTS

| | | | |
|---|---|---|---|
| 2,308,095 | 1/1943 | Meeder................................ | 356/121 |
| 3,474,417 | 10/1969 | Kazan.................................. | 250/553 |
| 3,634,689 | 1/1972 | Ejiri et al............................ | 250/553 |
| 3,657,547 | 4/1972 | Mansfield........................... | 250/578 |
| 3,800,146 | 3/1974 | Brunkhorst...................... | 250/211 J |

Primary Examiner—Maynard R. Wilbur
Assistant Examiner—S. C. Buczinski
Attorney, Agent, or Firm—Robert E. Burns; Emmanuel J. Lobato; Bruce L. Adams

[57] ABSTRACT

A luminescent element with a light directivity is located in a reference line and five light sensors are disposed to sense luminous intensities of the luminescent element in different directions of the luminescent element. A central one of the sensors has its center in the reference line. The remaining four sensors are disposed on a circle having its center in the reference line. A ratio between output voltages from two of the sensors is compared with a predetermined value to determine a deviation of a direction in which the light directivity of the element has a maximum value, from the reference line.

7 Claims, 8 Drawing Figures

DEVICE FOR DETERMINING LIGHT DIRECTIVITY OF LUMINESCENT ELEMENT

BACKGROUND OF THE INVENTION

This invention relates to a device for determining a light directivity of a luminescent element for emitting a directive beam of light, such as a semiconductor luminescent diode, and more particularly a deviation of a direction in which the light directivity has a maximum value, from a reference line for such a luminescent element.

There have been manufactured many types of semiconductor luminescent elements. For example, a pellet of semiconductive material formed of a semiconductive III–V compound such as gallium arsenide (GaAs) with a p-n junction disposed therein can emit light in response to an electric current flowing through the p-n junction. Such a pellet is called a semiconductor luminescent diode. Those semiconductor pellets have been, in many cases, fixedly secured to suitable headers and coated with light transmissive resins. Light emitted from the semiconductor luminescent pellets has been externally taken out from the coating thereon. It has been generally experienced that light developed from the coating has had a luminous intensity varied along the surface of the coating. The resulting profile of the luminous intensities becomes directive. The ideal profile of luminous intensities is to have a maximum value in a reference line, for example, on the central axis of the associated header and be symmetrical on both sides of the reference line. Actually, that direction in which the luminous intensity is maximum or the direction of the directivity could depart from the reference direction due to various causes such as a deviation of the position of the fixed pellet relative to the associated header, a deviation of the p-n junction in the pellet from its predetermined position, the non-uniformity of the transmissive coating etc. If the completed luminous elements have the profile of luminous intensities within certain tolerance limits as compared with the ideal profile of luminous intensities, then they can be commercially sold. Otherwise, the luminous elements are not suitable for commercial purposes. Therefore it is required to determine the light directivity of the products.

The conventional type of devices for determining the light directivity of luminescent elements has used a single light sensor to determine luminous intensities of the particular luminescent element in different directions while the element is being rotated about a predetermined axis. Then the determined values of the luminous intensity have been utilized to depict a curve for a profile of luminous intensities for the element which, in turn, provides a basis on which the element is determined to be accepted or rejected. This measure has led to the necessity of describing one curve for the profile of luminous intensities for each of luminescent elements, resulting in a great objection to the determination of whether luminescent elements mass-producted are accepted or rejected.

SUMMARY OF THE INVENTION

Accordingly it is an object of the present invention to provide a new and improved device for determining whether the light directivity of luminescent elements are accepted or rejected without rotating each of the luminescent elements about a predetermined axis and also without describing one curve for a profile of luminous intensities for each element.

The present invention accomplishes this object by the provision of a device for determining a light directivity of a luminescent element comprising, in combination, a luminescent element for emitting a directive beam of light, a light sensor unit including a plurality of light sensors to sense luminous intensities of the latter element, the light sensors producing respective output voltages, and a determination unit operatively connected to the light sensor unit to provide a ratio between said output voltages from the light sensors to determine the light directivity of the luminescent element on the basis of the ratio between the output voltages.

BRIEF DESCRIPTION OF THE DRAWINGS

The present invention will become more apparent from the following detailed description taken in conjunction with the accompanying drawings in which.

DESCRIPTION OF THE PREFERRED EMBODIMENT

Figure 1:
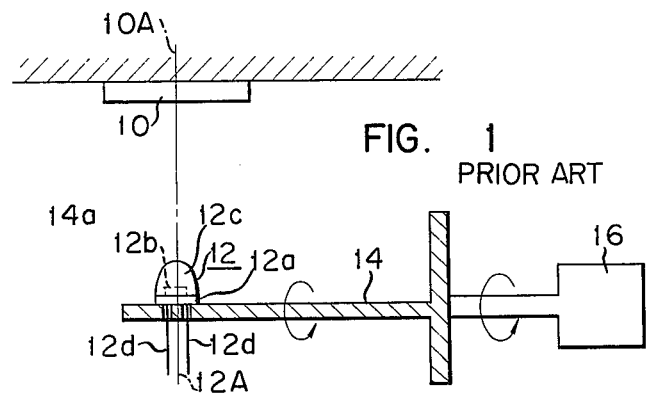
FIG. 1 is a front elevational view of a device for determining a light directivity of a luminescent element in accordance with the principles of the prior art.

For a better understanding of the present invention, a conventional device for determining a deviation of a light directivity of a luminescent element from a reference line for the luminescent element will now be described in conjunction with FIGS. 1 and 2 of the drawings. The arrangement illustrated comprises a stationary light sensor 10 having a central axis 10A, and a luminescent element 12 disposed in spaced opposite relationship with the light sensor 10. The luminescent element 12 may be, for example, a semiconductor luminescent diode and is supported on a rotatable supporting rod 14 adjacent the free end portion.

More specifically, the luminescent element 12 includes a header 12a having a flat surface, a semiconductor pellet 12b fixedly secured to the flat surface of the header 12a and a coating of light transmissive material 12c coating the semiconductor pellet 12b. A pair of leads 12d extend through the header 12a and are connected to the luminescent element 12. The luminescent element 12 has a reference axis 12A shown in FIG. 1 as being aligned with the central axis 10A of the light detector 10. The reference axis 12A is normal to a reference surface 14a of the supporting rod 14 to which the header 12a is mounted and passes through the center of the header 12a. The reference axis 12A is an axis on which a luminous intensity has a maximum value for a luminescent element formed into a perfect configuration with a high accuracy.

As shown in FIG. 1, a synchronous motor 16 is operatively coupled to the supporting rod 14 to rotate the luminescent element 12 so as to rotate the reference axis 12A of the latter in a plane orthogonal to the plane of FIG. 1 and including the central axis 10A of the light sensor 10.

Figure 2:
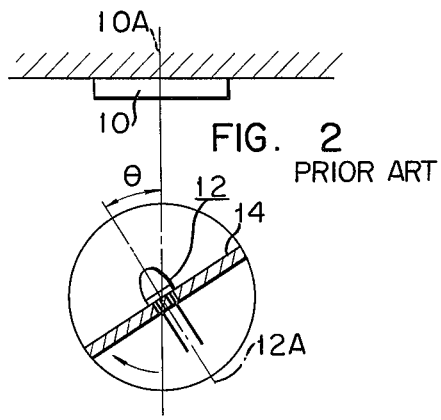
FIG. 2 is a side elevational view of the arrangement shown in FIG. 1.

In the arrangement as shown in FIGS. 1 and 2, the light sensor 10 measures a luminous intensity from the luminescent element 12 for a declination of $\theta$ formed between the central and reference axes 10A and 12A respectively as shown in FIG. 2 while the declination is successively varied. The result of those measurements can describe a light directivity or a curve for a profile of luminous intensities such as shown in FIG. 3.

Figure 3:
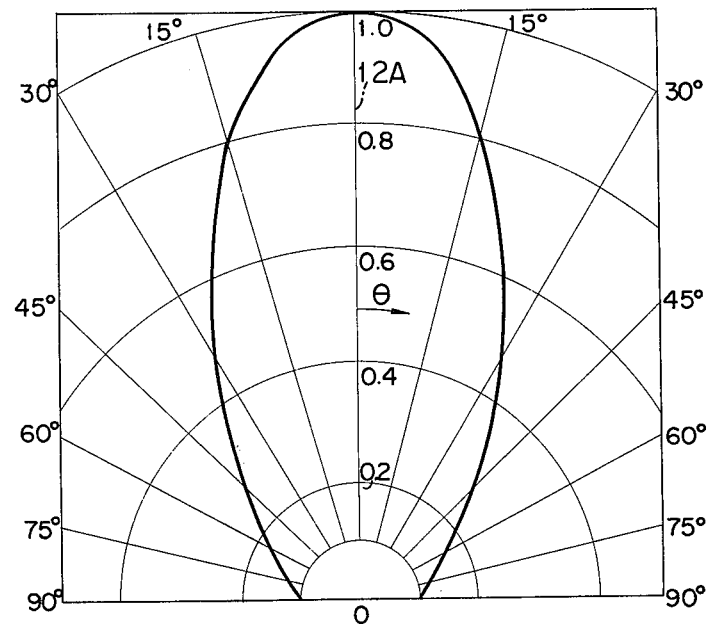
FIG. 3 is a graph illustrating one example of a light directivity.

In FIG. 3, the declination $\theta$ is defined by a vertical line 12A passing through the origin O and a radius vector, and a distance between the origin C and a point where a radius vector intersects the curve designates a luminous intensity at a declination of $\theta$ formed by the vertical line 12A and that radius vector. FIG. 3 shows an ideal light directivity having a maximum value in the vertical line 12A, and symmetric with respect with the vertical line 12A. In this case, the vertical line 12A coincides with the reference axis 12A of the luminescent element 12 as shown in FIGS. 1 and 2.

Upon the mass production of semiconductor luminescent diodes or the like, the light directivity could have a maximum value in a direction departing from the direction of the reference axis of the diodes due to a change in the mounting of diode pellets to their headers, a variation in the position of the p-n junction within the pellets etc. For example, the maximum luminous intensity might be in a direction deviating from the reference axis by an angle of 30°. The determination of this deviation has been previously accomplished by rotating each of luminescent elements in the manner as above described in conjuction with FIG. 2 and describing its light directivity. This has required to describe one light directivity for each of the luminescent elements for the determination of that direction in which the luminous intensity has a maximum value resulting in a low efficiency.

The present invention contemplates to improve an efficiency with which luminous elements are determined in terms of that direction in which the luminous intensity thereof has a maximum value.

Figure 4:
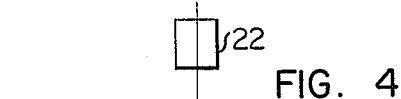
FIG. 4 is a front elevational view of a light sensor unit constructed in accordance with the principles of the present invention.
Figure 5:
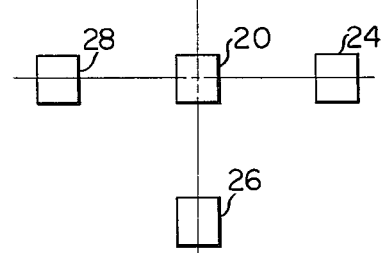
FIG. 5 is a plan view of the arrangement shown in FIG. 4.

Referring now to FIGS. 4 and 5, wherein like reference numerals designate the components identical or corresponding to those shown in FIG. 1, there is illustrated one embodiment of the present invention. The arrangement illustrated comprises a supporting block 14' having a supporting surface 14'a and fixedly secured to a supporting mechanism (not shown), and a luminescent element 12 supported on the supporting block 14'. The luminescent element 12 is identical to that shown in FIGS. 1 and 2 and has a header 12a mounted in surface contact relationship to the supporting surface 14'a on the block 14' as best shown in a somewhat enlarged scale on the righthand portion in FIG. 5. The reference axis 12A is shown in FIG. 5 as passing through the surface of the semiconductor pellet 12b at its luminous center O.

According to the principles of the present invention, a plurality, in this case, five of light sensors 20, 22, 24, 26 and 28 are disposed in a light receiving plane 30 extending perpendicularly to the reference axis 12A above the luminescent element 12 to receive light emitted from the luminescent element 12. As best shown in FIG. 4, the light sensor 20 has a central axis lying on the reference axis 12A while the remaining four sensors 22, 24, 26 and 28 are disposed at substantially equal angular intervals equal to angles of 90° on a circle having its center on the reference axis 12A. Thus the light sensors 22, 24, 26 and 28 are disposed symmetrically with respect to the central axis of the central sensor 20 to be equidistant from the latter axis. The light receiving plane 30 is spaced away from the luminescent element 12 by such a distance that straight lines connecting the central points of the respective sensors 22, 24, 26 and 28 to the luminous center O on the luminescent element 12 form angles of 30° with the reference axis 12A.

It is to be understood that the present invention sould not be restricted to the angle just specified and that any other suitable angle may be used.

The light sensors 20, 22, 24, 26 and 28 are preferably formed of silicon solar cells including light receiving surfaces in the form of squares having one side 3 mm long. The light receiving surfaces are flush with one another.

Figure 6:
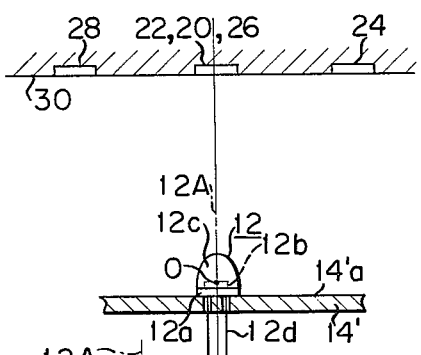
FIG. 6 is a circuit diagram of a determination unit constructed in accordance of the principles of the present invention to be operatively connected to the light sensor unit shown in FIG. 4.
Figure 6:
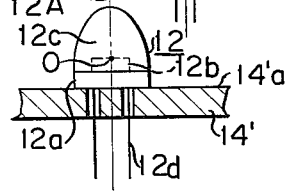
Figure 6:
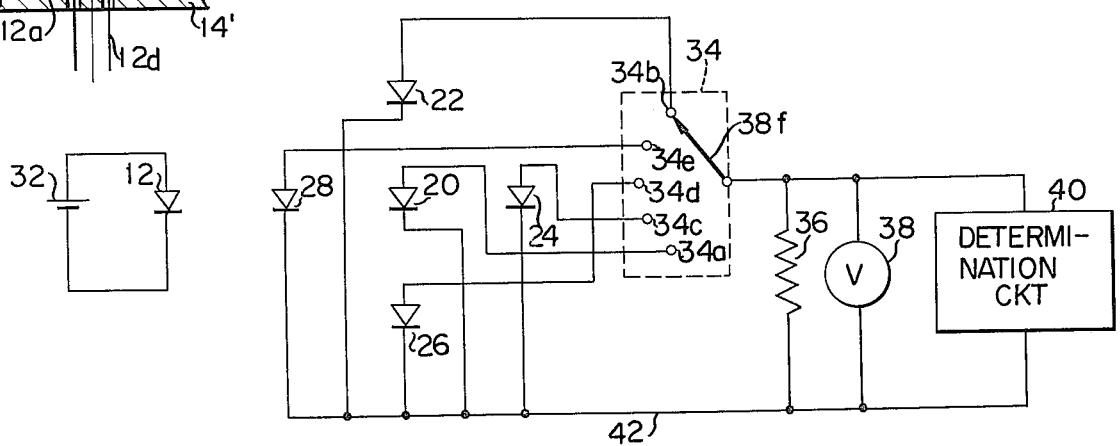

A light sensor unit formed of the arrangement as shown in FIGS. 4 and 5 are operatively coupled to a determination unit as shown in FIG. 6. In the arrangement of FIG. 6, a source of direct current 32 is connected across the luminescent element 12 to emit light from the latter. The light from the luminescent element 12 falls upon the light sensors 20, 22, 24, 26 and 28 disposed in the manner as above described in conjunction with FIGS. 4 and 5. All the light sensors 20, 22, 24, 26 and 28 include anode electrodes connected to a selection switch 34 at a plurality, in this case, five of stationary contacts 34a, 34b, 34c, 34d, and 34e respectively. The selection switch 34 includes a movable arm 34f selectively engageable by the stationary contacts and connected to a load resistor 36, a voltmeter 38 and a determination circuit 40 connected in parallel circuit relationship with one another. The components 36, 38 and 40 are connected to the cathode electrodes of the optical sensors 20, 22, 24, 26 and 28 through a conductor 42.

Output voltages from the light sensors 20, 22, 24, 26 and 28 are selectively applied to the load resistor 36, the volt-meter 38 and the determination circuit 40 to be selectively indicated by the voltmeter 38 while at the same time undergoing a logical operation performed by the determination circuit 40 as will be subsequently described.

The operation of the arrangement as shown in FIG. 6 will now be described with reference to a flow chart illustrated in FIG. 7. As above described, the light sensors 22, 24, 26 and 28 have their centers lying in the straight lines passed through the luminous center O on the luminescent element 12 and tilted at angles of 30° to the central line passed through the center of the central light sensor 20 and the luminescent center O. Therefore those sensors provide output voltage indicating luminous intensities in directions forming angles of 30° with the central line passed through the luminous center O and the center of the sensor 20. It is assumed that the light sensors 22, 24, 26 and 28 provide the output voltages $P_1$, $P_2$, $P_3$, and $P_4$ respectively. The central light sensor 20 senses a luminous intensity in the reference direction 12A.

Figure 7:
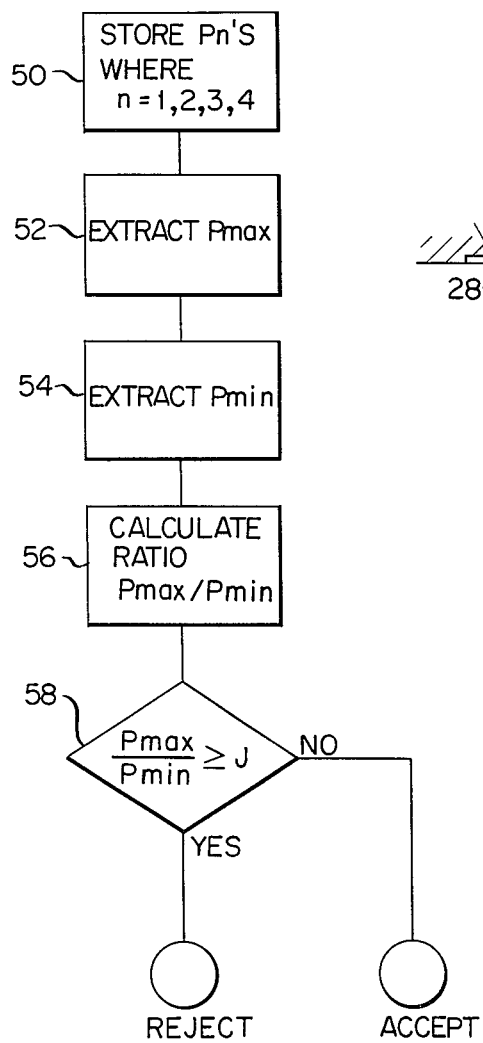
FIG. 7 is a flow chart illustrating the steps of determining a deviation of a light directivity from a reference line in accordance with the principles of the present invention.

In block 50 as shown in FIG. 7, the selection switch 34 is rotated to successively store the output voltages $P_1$, $P_2$, $P_3$ and $P_4$ from the light sensors 22, 24, 26 and 28 in a memory (not shown) disposed in the determination circuit 40. Then the circuit 40 goes to block 52 where that stored voltage Pmax having a maximum value is extracted among the stored output voltages $P_1$, $P_2$, $P_3$ and $P_4$ and stored in the memory after which that output voltage Pmin. having a minimum value is extracted among the stored voltages $P_1$, $P_2$, $P_3$ and $P_4$ and stored in the memory in block 54. Following this, block 56 calculates a ratio of the maximum to the minimum output voltage Pmax/Pmin. The next block 58 is to determine if the calculated ratio of Pmax/Pmin is equal to or greater than a predetermined reference value J of the ratio of the maximum to the minimum voltage Pmax/Pmin. If the calculated ratio of voltage is equal to or greater than the reference value J as determined in block 58, then the luminescent element being measured is determined to have an optical directivity unsuitable as a commercial product and therefore rejected. On the other hand, if the calculated voltage ratio is less than the reference value J as determined in block 58, then the luminescent element being measured is to be accepted.

Then the process as above described is repeated with another luminescent element.

Figure 8:
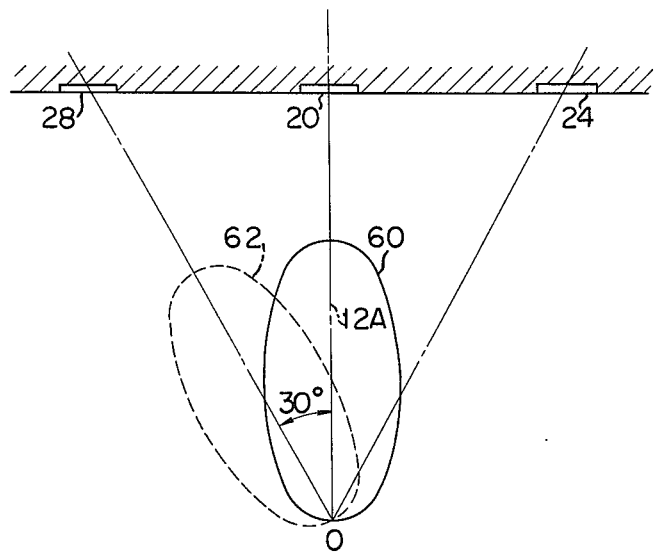
FIG. 8 is a graph useful in explaining the operation of the present invention.

As an example, the description will now be made in terms of a particular semiconductor luminescent diode whose directivity has a half-value angle $\theta_{1/2}$ of 60° and a maximum value in a direction deviating from the reference axis thereof by an angle of 30°, and with reference to FIG. 8. The term "half-value angle" means an angle between the reference direction 12 and that direction in which a luminous intensity is equal to one half a maximum value of the luminous intensity in a light directivity. FIG. 8 shows a sectional view of the arrangement shown in FIGS. 4 and 5 with the section taken in a plane containing the centers of the light sensors 20, 24 and 28. In FIG. 8 it is assumed that a curve for a profile of luminous intensities illustrated is in the form of an ellipse. Although the actual profile of luminous intensities is not strictly in the form of an ellipse as shown in FIG. 3, it can be considered that it may satisfactorily approximate an ellipse without any large error. In FIG. 8, a solid ellipse 60 designates a light directivity without any deviation while a dotted ellipse 62 designates a light directivity having a direction, in which a maximum value appears, deviating from the reference axis by angle of 30 degrees on the side of the light sensor 28.

When the particular light directivity does not deviated from its the reference axis, the light sensors 22, 24, 26 and 28 are equal in the output voltage to one another so that a ratio of a maximum to a minimum output voltage is equal to one. However when the deviation of the light directivity is of 30° on the side of the light sensor 28 as above described, the light sensor 28 produces a maximum one of the output voltages while the light sensor 24 produces a minimum voltage. Under these circumstances, a ratio of a maximum to a minimum voltage is expressed by $P_4/P_2$ which has been measured to be of about thirteen. This figure is substantially different from the figure of "one" obtained for no deviation. The luminescent element as above described has been determined to have a light directivity having a deviation greater than the reference value and therefore rejected.

The central light sensor 20 serves to produce an output voltage indicating a luminous intensity on the reference axis 12A.

It is also able to determine the deviation of the light directivity of a luminescent element by comparring the ratio of the output voltage from each outer sensor 22, 24, 26, 28 and the output voltage from the central sensor 20 with a predetermined value.

From the foregoing it will be appreciated that the arrangement as shown in FIGS. 4 and 5 are operatively combined with the arrangement of FIG. 6 to permit the determination of a deviation of a light directivity from the reference axis.

While the present invention has been illustrated and described in conjunction with a single preferred embodiment thereof it is to be understood that various changes and modification may be resorted to without departing from the spirit and scope of the present invention. For example, the light sensors may be formed of any other suitable semiconductive material rather than silicon and any desired number thereof may be used. Also the present invention may be incorporated into an automatically sorting apparatus to rapidly select those luminescent elements having the light directivity whose deviation is within a predetermined range.

What we claim is:

1. Apparatus for determining the spatial directivity of light emitted from a luminescent element, comprising:
   a plurality of light sensors each having a light responsive area and disposed with the centers of their respective light responsive areas on a single circle, each sensor of said plurality of sensors developing a signal representative of the intensity of light incident on its light responsive area;
   means responsive to the light sensor signals for calculating the ratio of the maximum intensity to the minimum intensity of incident light sensed by said plurality of sensors and for determining if the calculated ratio is greater than a predetermined value; and
   means for applying the output signal from each sensor of said plurality of sensors to said means responsive to the light sensor signals.

2. Apparatus for determining the spatial directivity of light, according to claim 1, wherein said means responsive to the light sensor signals further comprises memory means for storing the output signal from each of said light sensors.

3. Apparatus for determining the spatial directivity of light, according to claim 1 wherein said means for applying the output signal from each sensor includes a switch operable to sequentially apply the output signal from each sensor of said plurality of sensors to said means responsive to the light sensor signals.

4. Apparatus for determining the spatial directivity of light, according to claim 1 wherein said plurality of light sensors comprises four light sensors disposed with the centers of their respective light responsive areas on a circle and spaced ninety degrees apart.

5. Apparatus for determining the spatial directivity of light, according to claim 1 wherein said plurality of light sensors are equispaced on the circle defined by said plurality of light sensors.

6. Apparatus for determining the spatial directivity of light, according to claim 1, further comprising another light sensor disposed at the center of the circle defined by said plurality of light sensors.

7. Apparatus for determining the spatial directivity of light, according to claim 1, further comprising means for positioning the luminescent element under test at a position spaced from said plurality of light sensors and on a line extending through the center of and perpendicular to the plane of the circle defined by said plurality of light sensors.

* * * * *